Dec. 14, 1943.  C. E. BUOTE  2,336,593
TEXTILE SPINDLE
Filed Feb. 13, 1941
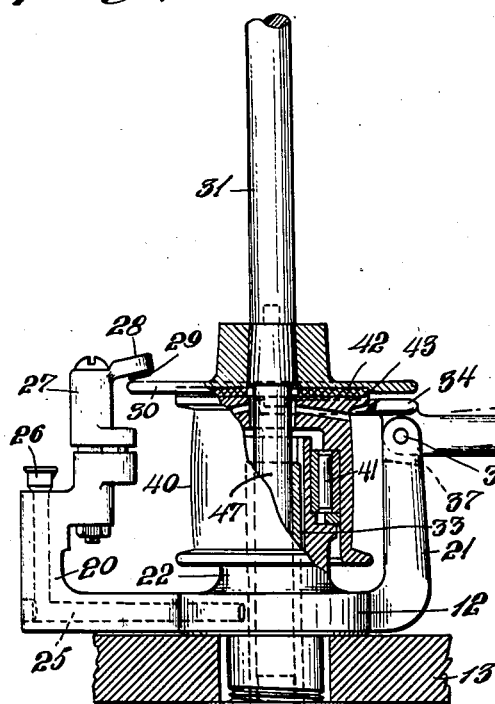
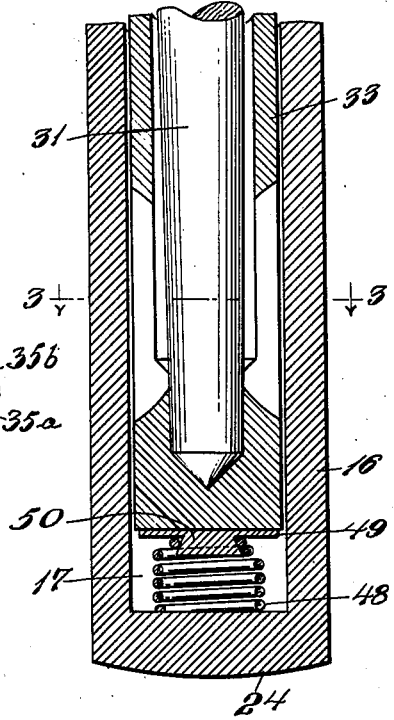
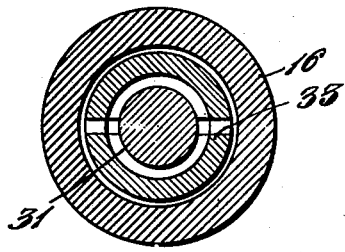
INVENTOR.
Clarence E. Buote
BY Barlow & Barlow
ATTORNEYS.

Patented Dec. 14, 1943

2,336,593

UNITED STATES PATENT OFFICE 2,336,593

TEXTILE SPINDLE

Clarence E. Buote, Pawtucket, R. I., assignor to H & B American Machine Company, a corporation of Maine Application February 13, 1941, Serial No. 378,755

5 Claims. (Cl. 57—135)

This invention relates to spindles of the kind used in machines for spinning and twisting yarns, and various textile fibers, and more particularly to a textile spindle of the kind which has a flange fast on the spindle blade, a positively-driven whorl encircling the upper end portion of the spindle base and loosely mounted for rotation thereon, and an annular friction member interposed between the flange and the whorl whereby the spindle blade is driven and rotated with the whorl by friction of the annular friction member against the end of either the whorl or the flange, according to the particular mounting arrangement employed for holding the friction member; and provision is made for disengagement of such friction driving connection of the friction member to stop the rotation of the spindle blade by enabling it to be raised bodily by the operation of a brake device to separate the driving surfaces.

The primary object of the invention is to provide means for maintaining positive driving connection between the friction connector member and the rotatable part frictionally engaged thereby, and also for maintaining the lower end of the spindle blade properly seated for rotation in its lower bearing during the operation of the spindle.

Another object of the invention is the provision of a wear take-up device capable of maintaining uniform driving connection between the friction connector member and the rotatable part frictionally connected thereto regardless of any wear developing in the friction member.

Another object of the invention is to provide practical, efficient and reliable means which will act automatically during the operation of the spindle to compensate for the normal wear occurring between the annular friction member and the rotatable part with which it has frictional connection whereby uniform driving connection will be insured and maintained between the friction member and the frictionally engaged part against which it bears during the running of the spindle.

Another object of the invention is the yieldably supporting of the spindle blade of a spindle of the above class whereby the flanged member carrying the friction member can move downwardly as the friction member wears down and yet the spindle blade will be properly seated in its footstep bearing at all times regardless of such wearing down of the friction connector member.

Another object of the invention is to provide a spindle construction of the above character in which the spindle blade will have proper bearing support at the top and bottom of the bolster member for rotation therein during the running of the spindle, and in which substantially uniform friction will be maintained between the friction member and the positively rotated whorl with which the friction member has positive frictional engagement and by which it is driven.

Another object of the invention is to provide a self-adjusting footstep bearing for the lower end portion of the spindle blade and capable of permitting progressive axial movement of the spindle blade inwardly of the bolster case proportional to the rate of wearing-down of the friction member.

Another object of the invention is the yieldable supporting of the spindle bolster for axial movement in the bolster case in which it is mounted.

Another object of the invention is the provision of a spindle construction for the above defined purpose which will also permit the spindle blade and its bolster to be quickly and easily removed, either separately or as a unit, from the bolster case.

With these and other objects in view, the invention consists of certain novel features of construction, as will be more fully described, and particularly pointed out in the appended claims.

In the accompanying drawing:

Fig. 1 is a side elevation, partly in section, of a spinning or twisting spindle embodying my invention with the spindle mounted upon a rail;

Fig. 2 is an enlarged fragmentary longitudinal sectional view of the lower end portion of the spindle shown in Fig. 1, showing the spindle blade, bolster and bolster case assembly with the bolster resiliently mounted in the bolster case;

Fig. 3 is a detail transverse sectional view taken on line 3—3 of Fig. 2; and

Fig. 4 is an enlarged detail side elevational view of the abutment member upon which the bolster rests when it is supported by the spring located in the lower end portion of the bolster case.

In the practical embodiment of my invention which I have illustrated by way of example in the drawing, the embodiment shown in Figs. 1 and 2 comprises a bolster case 10 having a head flange 12 adapted to be seated upon the usual spindle rail 13 and securely clamped to the rail by means of a nut 14 on an exteriorly threaded portion 15 of the hollow, generally cylindrical or tubular stem portion 16 which extends downwardly from the flange 12 and has a longitudinal cylindrical bore 17 to provide a bolster-receiving chamber 18 and also an oil reservoir for the spindle. The head flange 12 is provided with two lateral upwardly extending arms 20 and 21 respectively, disposed at diametrically opposite sides of a sleeve-like portion 22 which extends upwardly from the flange 12 and so arranged as to constitute an extension of the stem portion 16. The lower terminal end of the bore 17 of the stem 16 is closed as indicated at 24, and this cylindrical bore which forms the chamber 18 is co-extensive with the cylindrical bore of the sleeve-like extension 22. The arm 20 is provided with an oil duct 25 which is suitably arranged therein and leads to the chamber 18 from the usual oil cup 26, as is a well known construction in the art. Mounted upon the upper end extremity of the arm 20 is the detent member 27 which is suitably bolted to the arm, and when thus secured, serves to support the projection 28 of the detent member carrying a friction pad 29 in an extended and spaced position over the marginal edge portion of the circularly flanged member 30 which is fast on the spindle blade 31. Thus, the detent member 27 acts to lock the blade against accidental removal from the bolster 33 while at the same time provides a brake to stop the spindle when the flanged member 30 is lifted and forced against the pad 29 during upward swinging movement of the forked brake arms 34 of the brake lever 35 on the pivot pin 36 when the brake lever 35 is actuated by suitable mechanism (not shown) and caused to rock on the pin 36 fixed in the slotted portion 37 at the upper terminal end of the arm 21.

A whorl 40, which is positively driven by a belt (not shown), is provided, and the whorl encircles and is loosely rotatable upon the upper sleeve-like extension 22 of the base by means of the antifriction bearings 41. The flanged member 30 for rotating the spindle blade 31 is positively driven by the whorl 40 by friction of an annular friction member 42 which is carried by the flanged member 30 and has positive frictional driving connection with the top or upper end face of the whorl. The annular friction member 42 may be composed of a suitable friction material such as a washer of leather, fiber, rubber, cork, or of various known friction materials of the kind employed for brake linings. The annular friction member 42 is shown as having substantially the same outer diameter as the top of the whorl, but it need not be restricted thereto, as it may be of smaller diameter, if desired; and as shown in Fig. 1, it is fixedly mounted and retained within an annular recess 43 formed in the undersurface of the flanged member 30. With this construction, it will be apparent that the weight of the spindle, with or without its package or bobbin, will be sufficient to hold the friction member 42 seated in firm, positive frictional driving engagement with the whorl 40 during the normal running of the spindle. The present construction will also permit the separation or disconnection of the frictional drive coupling between the whorl 40 and the friction member 42 whenever it is desired to stop the spindle, which result is effected by the separation of the parts by the downward movement of the brake lever 35 into the position 35a from the position shown in full lines in Fig. 1 to lift the flanged member 30 to remove the annular member 41 out of contact with the top face of the whorl while at the same time this disconnecting movement also forces the top surface of the flanged member 30 against the friction pad 29 with sufficient pressue to stop the rotating spindle. When the spindle is running, the brake lever 35 may be swung to the position 35b indicated by the dot and dash lines in Fig. 1, if desired.

The bolster 33 is of hollow, cylindrical form, having a cylindrical bore 45 extending substantially through the major portion of its length and terminating at its lower end with a smaller bore 46 which has a conically-recessed bottom surface to provide the lower bearing for receiving and supporting the conical end of the spindle blade 31. The upper end portion of the bolster provides a cylindrical bearing portion which has a running fit and supports the cylindrical portion 47 of the spindle blade 31 during its rotation in the bolster.

In order to insure and maintain the positive driving connection of the friction member 42 with the whorl 40 and also to maintain the conical end of the spindle blade 31 properly seated in the bore 46 of the lower footstep bearing regardless of any wearing-down of the whorl-engaging surface of the friction member 42, the invention contemplates means for automatically compensating for such wearing-down of the friction member 42. To this end, I provide a yieldable mounting device in the form of an expanding member for resiliently supporting the bolster which device is so constructed and arranged as to apply upward pressure to the lower end of the bolster to support the same and yet is sufficiently yieldable to permit the bolster to descend inwardly into the bolster case as the friction material wears and thereby maintain the driving friction of the friction members. In the illustrated embodiment, the bolster is shown as being yieldably supported by a spring 48 which will apply and exert upward pressure in an axial direction to the lower end of the bolster from its underside, and the spring pressure is of such strength that it will act thereon only with sufficient force to support the weight of the bolster and to maintain contact of the conical footstep bearing at the bottom of the bolster with the conical bottom end of the spindle blade, with or without its load, and yet permit the bolster to move axially inwardly into the bolster case as the friction member 42 wears down thereby maintaining uniform frictional driving engagement of the friction member 42 with the whorl and insuring that the lower end of the spindle blade will be properly seated and run freely without binding in the footstep bearing of said bolster at all times during operation of the spindle.

As an example of such means, I have shown a helical compression spring 48 which is located in the lower end portion of the bolster case, one end convolution of the spring resting against the closed end 24 of the bolster case and the other end convolution resting in contact with the underside of the circular flange 49 of an abutment member 50 whereby the latter is held in contact with the lower end face of the bolster 33 by the upward pressure of the spring 48. As shown in Fig. 4, the abutment member 50 has in addition to the circular flange 49, a generally frusto-conical hub-like portion 51 which is inserted into and secured to the upper end coils of the spring 48, these convolutions being in a volute formation and progressively decreasing diameter in order to securely anchor the spring to the abutment member. Thus, the spring 48 will automatically raise the abutment member and hold it in contact with the lower end of the spindle bolster by pressure applied underneath the same.

I claim:

1. A spindle construction comprising a bolster case, a bolster within said case, said bolster being non-rotatable and loosely mounted in said case for longitudinal movement downwardly therein, a bearing in the lower end of said bolster, a whorl rotatably mounted on the upper end of said case, a spindle blade member, said blade having its lower portion extending into said bolster and its lower end engaged by said bearing, a flange member secured to said blade above said whorl, a friction member between said flange and said whorl for driving said blade, and resilient means acting against the bottom end of said bolster tending to urge said bolster upwardly and flexibly press said bearing against the lower end of the spindle blade, which pressure will at all times be of sufficient strength only to hold said bearing in free running contact with said blade, said resilient means being operative yieldingly to permit a limited downward movement of said bolster with respect to said case to compensate for the gradual descent of said blade into the case as the friction member wears so that no binding of the blade will result.

2. A spindle construction comprising a bolster case, a bolster within said case, said bolster being non-rotatable and loosely mounted in said case for longitudinal movement downwardly therein, a step bearing in the lower end of said bolster, a whorl rotatably mounted on the upper end of said case, a spindle blade member, said blade having its lower portion extending into said bolster and its lower end engaged by said step bearing, a flange member secured to said blade above said whorl, a friction member secured to said flange and engaging said whorl for driving said blade, and resilient means acting against the botttom end of said bolster tending to urge said bolster upwardly and flexibly press said bearing against the lower end of the spindle blade, which pressure will at all times be of sufficient strength only to hold said bearing in free running contact with said blade, said resilient means being operative yieldingly to permit a limited downward movement of said bolster with respect to said case to compensate for the gradual descent of said blade into the case as the friction member wears so that no binding of the blade will result.

3. A spindle construction comprising a bolster case, a bolster within said case, said bolster being non-rotatable and loosely mounted in said case for longitudinal movement downwardly therein, a bearing in the lower end of said bolster, a whorl rotatably mounted on the upper end of said case, a spindle blade member, said blade having its lower portion extending into said bolster and its lower end engaged by said bearing, a flange member secured to said blade above said whorl, a friction member between said flange and said whorl for driving said blade, and means including a coiled compression spring acting against the bottom end of said bolster tending to urge said bolster upwardly and flexibly press said bearing against the lower end of the spindle blade, said spring being of sufficient strength only to hold said bearing in free running contact with said blade in any of its different operating positions, said means being operative yieldingly to permit a limited downward movement of said bolster with respect to said case to compensate for the gradual descent of said blade into the case as the friction member wears so that no binding of the blade will result.

4. A spindle construction comprising a base, a bolster case depending from said base having a short tubular part which extends upwardly from said base and provides a housing for the upper end of a bolster, a bolster within said case, said bolster being non-rotatable and loosely mounted in said case for longitudinal movement downwardly therein, a step bearing in the lower end of said bolster, a whorl rotatably mounted on the upper end of said short tubular part, a spindle blade, said blade having its lower portion extending into said bolster and its lower end engaged by said step bearing, a flange secured to said blade above said whorl, an annular friction member secured to said flange and engaging said whorl for driving said blade, and resilient means acting against the bottom end of said bolster tending to urge said bolster vertically and flexibly press said bearing against the lower end of the spindle blade, said resilient means being constructed and arranged so as to exert only enough pressure on said bearing to insure that the blade will at all times run freely therein, and operative yieldingly to permit a limited downward movement of said bolster with respect to said case to compensate for the gradual descent of said blade into the case as said friction member wears whereby no binding of the blade in said bearing will result.

5. A spindle construction comprising a bolster case secured to a rail and having a closed end; a driven whorl rotatably mounted on said bolster case; a spindle blade extending freely downwardly through said whorl within said bolster case and having a tapered end; a flanged member secured to said spindle blade above said whorl; a friction member carried by said flanged member and arranged to rest on said whorl whereby the said spindle blade is frictionally driven by said whorl; a non-rotatable bolster in said bolster case arranged for longitudinal movement therein, having near its upper end a cylindrical bearing for said spindle blade and having near its lower end a cone bearing for the tapered end of said spindle blade; and resilient means interposed between the closed end of said bolster case and the lower end of said bolster for holding said cone bearing against the tapered end of the spindle blade while yielding to permit downward movement of the spindle blade upon wearing of the said friction member.

CLARENCE E. BUOTE.